United States Patent
Barbu et al.

(10) Patent No.: US 11,765,708 B2
(45) Date of Patent: Sep. 19, 2023

(54) GEOGRAPHIC INFORMATION SYSTEM (GIS)-NEW RADIO (NR) BEAMFORMING FOR MILLIMETER WAVE

(71) Applicant: Nokia Technologies Oy, Espoo (FI)

(72) Inventors: Oana-Elena Barbu, Aalborg (DK); Simon Svendsen, Aalborg (DK); Benny Vejlgaard, Gistrup (DK); Mark Cudak, Rolling Meadows, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 173 days.

(21) Appl. No.: 17/148,018

(22) Filed: Jan. 13, 2021

(65) Prior Publication Data

US 2021/0243744 A1    Aug. 5, 2021

Related U.S. Application Data (60) Provisional application No. 62/968,554, filed on Jan. 31, 2020.

(51) Int. Cl.
*H04W 72/044* (2023.01)
*H04W 72/51* (2023.01)

(52) U.S. Cl.
CPC ......... *H04W 72/046* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 2013/0029707 A1* | 1/2013 | Virta | H04B 17/309 455/507 |
| 2018/0042018 A1* | 2/2018 | Bhushan | H04W 16/14 |
| 2018/0048442 A1 | 2/2018 | Sang et al. | |
| 2018/0109344 A1* | 4/2018 | Ly | H04L 5/0048 |
| 2018/0115958 A1* | 4/2018 | Raghavan | H04B 7/0697 |

(Continued)

FOREIGN PATENT DOCUMENTS

WO    2019/054908 A1    3/2019

OTHER PUBLICATIONS

"3rd Generation Partnership Project; Technical Specification Group Radio Access Network; Study on New Radio Access Technology Physical Layer Aspects (Release 14)", 3GPP TR 38.802, V14.2.0, Sep. 2017, pp. 1-144.

(Continued)

*Primary Examiner* — Nicholas Sloms
(74) *Attorney, Agent, or Firm* — SQUIRE PATTON BOGGS (US) LLP (57) ABSTRACT

Systems, methods, apparatuses, and computer program products for GIS-NR beamforming for mmWave. For example, certain embodiments may provide for beam realignment, through which a serving network node may be able to re-position its beam towards a UE without the UE explicitly measuring and signalling to the network node the need for realignment. Instead of performing the traditional UE-based exhaustive beam search, the serving network node may proactively switch the beam in an attempt to track the UE movements. The serving network node may do this by corroborating information from two types of sources: 1) a set of neighbor mobile or fixed network nodes and 2) a geographic information system (GIS).

18 Claims, 6 Drawing Sheets

(56) References Cited

U.S. PATENT DOCUMENTS

| | | | | |
|---|---|---|---|---|
| 2018/0124673 | A1* | 5/2018 | Tenny | H04L 5/0091 |
| 2018/0124724 | A1* | 5/2018 | Tsai | H04W 74/0833 |
| 2018/0227035 | A1 | 8/2018 | Cheng et al. | |
| 2018/0279181 | A1* | 9/2018 | Hampel | H04W 36/0033 |
| 2018/0338271 | A1* | 11/2018 | Park | H04W 36/0077 |
| 2018/0352491 | A1* | 12/2018 | Shih | H04W 76/27 |
| 2019/0053244 | A1* | 2/2019 | Mildh | H04W 48/08 |
| 2019/0115967 | A1 | 4/2019 | Islam et al. | |
| 2019/0268051 | A1* | 8/2019 | Ho | H04B 7/0682 |
| 2019/0268782 | A1* | 8/2019 | Martin | H04W 36/0094 |
| 2019/0281568 | A1 | 9/2019 | Jung et al. | |
| 2019/0289516 | A1* | 9/2019 | Zhang | H04W 36/08 |
| 2019/0319686 | A1* | 10/2019 | Chen, IV | H04B 7/0639 |
| 2019/0320364 | A1 | 10/2019 | Jeon et al. | |
| 2019/0327660 | A1* | 10/2019 | Hong | H04W 40/38 |
| 2020/0068484 | A1* | 2/2020 | da Silva | H04W 24/10 |
| 2020/0137714 | A1* | 4/2020 | Kumar | H04W 64/00 |
| 2020/0178137 | A1* | 6/2020 | Hassan Hussein | H04W 36/00835 |
| 2020/0322863 | A1* | 10/2020 | Wang | H04W 48/16 |
| 2020/0383014 | A1* | 12/2020 | Chen | H04W 48/20 |
| 2021/0329591 | A1* | 10/2021 | Hwang | H04W 68/02 |
| 2021/0360477 | A1* | 11/2021 | Hwang | H04W 48/20 |
| 2021/0392659 | A1* | 12/2021 | Tirronen | H04L 1/1671 |
| 2022/0078683 | A1* | 3/2022 | Eklöf | H04W 36/08 |
| 2022/0104153 | A1* | 3/2022 | Ko | H04W 48/10 |
| 2022/0124507 | A1* | 4/2022 | Ryu | H04L 27/26 |

OTHER PUBLICATIONS

Giordani et al."A Tutorial on Beam Management for 3GPP NR at mmWave Frequencies", IEEE Communications Surveys & Tutorials, vol. 21, No. 1, First Quarter 2019, pp. 173-196.

"3rd Generation Partnership Project; Technical Specification Group Radio Access Network; Study on requirements for NR beyond 52.6 GHz (Release 16)", 3GPP TR 38.807, V1.0.0, Sep. 2019, 66 pages.

Orikumhi et al., "Location-aware Beam Alignment for mmWave Communications", arXiv, Jul. 4, 2019, pp. 1-30.

Maschietti et al., "Robust Location-Aided Beam Alignment in Millimeter Wave Massive MIMO", arXiv, Aug. 28, 2017, pp. 1-24.

"3rd Generation Partnership Project; Technical Specification Group Radio Access Network; NR; NR and NG-RAN Overall Description; Stage 2 (Release 15)", 3GPP TS 38.300, V15.6.0, Jun. 2019, pp. 1-99.

Extended European Search Report received for corresponding European Patent Application No. 21153678.4, dated Jun. 14, 2021, 11 pages.

Alkhateeb et al.,"Deep Learning Coordinated Beamforming for Highly-Mobile Millimeter Wave Systems", Arxiv, Feb. 22, 2019, pp. 1-42.

Ali et al., "Millimeter Wave Beam-Selection Using Out-of-Band Spatial Information", IEEE Transactions on Wireless Communications, vol. 17, No. 2, Feb. 2018, pp. 1038-1052.

Jameel et al., "Propagation Channels for mmWave Vehicular Communications: State-of-the-art and Future Research Directions", IEEE Wireless Communications, vol. 26, No. 1, Feb. 2019, pp. 144-150.

* cited by examiner

GEOGRAPHIC INFORMATION SYSTEM (GIS)-NEW RADIO (NR) BEAMFORMING FOR MILLIMETER WAVE

CROSS REFERENCE TO RELATED APPLICATIONS

This application claims priority from U.S. Provisional Application No. 62/968,554, filed on Jan. 31, 2020. The entire contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for geographic information system (GIS)-new radio (NR) beamforming for millimeter wave (mmWave).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

BRIEF DESCRIPTION OF THE DRAWINGS

For proper understanding of example embodiments, reference should be made to the accompanying drawings, wherein.

SUMMARY

According some aspects, there is provided the subject matter of the independent claims. Some further aspects are defined in the dependent claims. The embodiments that do not fall under the scope of the claims are to be interpreted as examples useful for understanding the disclosure.

In a first aspect thereof the exemplary embodiments of this invention provide an apparatus that comprises at least one processor; and at least one memory including computer program code, wherein the at least one memory and the computer program code are configured to, with the at least one processor, cause the apparatus at least to: compute at least one beam camp time of at least one user equipment based on at least one metric; signal the at least one beam camp time to the at least one user equipment; transmit, to at least one network node, at least one user equipment identifier, the at least one beam camp time, and at least one radio beacon parameterization for the at least one user equipment; and perform at least one beam reselection for the at least one user equipment based on at least one updated relative timing for the at least one user equipment.

In a further aspect thereof the exemplary embodiments of this invention provide an apparatus that comprises at least one processor; and at least one memory including computer program code, wherein the at least one memory and the computer program code are configured to, with the at least one processor, cause the apparatus at least to: receive information that identifies at least one beam camp time of the apparatus; determine that at least one beam reselection is triggered; transmit at least one radio beacon based on determining that the at least one beam reselection is triggered; and reselect at least one beam to point towards at least one network node after transmitting the at least one radio beacon.

In another aspect thereof the exemplary embodiments of this invention provide an apparatus that comprises at least one processor; and at least one memory including computer program code, wherein the at least one memory and the computer program code are configured to, with the at least one processor, cause the apparatus at least to: receive at least one user equipment identifier, at least one beam camp time, and at least one radio beacon parameterization for the at least one user equipment; detect at least one radio beacon from the at least one user equipment; compute at least one relative timing for the at least one user equipment; and transmit the at least one relative timing to at least one network node.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for GIS-NR beamforming for mmWave is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Extension and then redesign of 5G NR procedures to enable access in the spectrum 52.6 gigahertz (GHz) to 114.25 GHz may be a target of the Third Generation Partnership Project (3GPP). Operation in this range is particularly challenging due to, for example, high atmospheric absorption (the higher the carrier frequency, the more opaque a material becomes), lower power amplifier efficiency, and strong power spectral density regulatory requirements compared to lower frequency bands. Additionally, the frequency ranges above 52.6 GHz potentially contain larger spectrum allocations and larger bandwidths that are not available for bands lower than 52.6 GHz and may have to support widely ranging use cases, such as vehicle-to-everything (V2X), integrated access and backhaul (IAB), NR licensed and unlicensed spectrums, and non-terrestrial operations. These conditions translate in a radio channel (e.g., a channel which combines a wireless propagation channel with antenna responses), which yields 30 decibels (dBs) of loss for operation at 60 GHz compared with 2 GHz. Hence, to overcome these challenges, the network node (e.g., gNB)-UE pair may have to maintain a beamed connection realized with narrow transmit and receive beams. Since beam narrowness implies small angular coverage, a fine and often beam alignment process may have to be in place. However, such a procedure may be associated with a series of disadvantages.

The lossy radio channel (e.g., at least 30 dBs at 60 GHz) may have to be compensated for by applying beamforming both at the transmit (Tx) and receive (Rx) points. Certain beamforming gains may be achieved by increasing the size of the antenna arrays, which yields narrower beam width compared to that which is used for operation in frequency range 2 (FR2). However, narrower beam coverage has at least two implications: 1) hundreds of beams and 2) frequent re-alignments may have to be performed. With respect to 1), for full cell coverage, the network node (gNB) may have to generate and transmit reference signals (RSs) with many narrow beams. This implies a high RS overhead. With respect to 2), a small UE displacement (e.g., physical movement or tilt) can cause a beam misalignment and trigger beam re-alignment procedures. If these are not optimized, the UE-network node (gNB) pair may spend numerous resources (e.g., time and processing power) to constantly re-align their transmission.

Therefore, if the current FR2 beam alignment procedure was extended to beyond 52.6 GHz operation, then the number of wide beams may be significantly higher than 64 (the number currently defined for FR2). Therefore, the UE would need to sweep through potentially thousands of Tx-Rx beam pairs. This may be further worsened because operation with narrow beams may generate frequent misalignments, a situation which, to recover from, may have to have another full beam sweep by the UE.

To illustrate the problem, consider a scenario where it is assumed that a UE moves on an arc AB with a velocity of 50 kilometers per hour (km/h). Assume further that a single network node (gNB) narrow-beam has an angular spread of 3 degrees and that the cell has a radius of 50 m. That means that the UE will exit the coverage of a beam after $$t = \frac{l_{AB}}{v} = \frac{r\theta}{v} = 180 \text{ milliseconds (ms)}.$$

In this case, the UE may have to perform a full beam search at a rate higher than 1/180 kilohertz (kHz) to ensure it is always served by the best beam. This implies that, within 180 ms, the UE would have to be able to switch among all its receive beams, perform hundreds of beam-pair measurements, and report the best beam, along with maintaining its data connection.

This consumes a significant amount of time and power resources of the UE and it is, therefore, apparent that the UE overhead surges in these scenarios and that there is a need for less power-consuming beam management alternatives. Extending the current beam alignment procedure to beyond 52.6 GHz may mean that the UE may have to perform frequent and exhaustive beam pair searches and a tight beam-realignment procedure. That makes it an inefficient solution, and better alternatives may have to be used.

The current standard 3GPP beam management for FR 2 is based on a hierarchical and exhaustive beam search. The method consists of 3 phases, P1, P2, and P3. In P1, a network node (gNB) transmits an RS with wide beams called synchronization signal blocks (SSB), and summing to a total of 64. The UE listens, selects the best beam, and reports it to the network node (gNB). In P2, the network node (gNB) transmits an RS with narrow beams (called channel state information (CSI)-RS) belonging to the SSBs found in P1. Similarly, the UE chooses the best narrow beam and reports it back to the network node. In P3, the network node (gNB) transmits with the best narrow beam from P2 and the UE sweeps through its receive beams to choose the best one. SSBs are transmitted periodically in a sequential pattern covering multiple directions.

Each of the SSBs represent different areas/directions of the sector covered by the serving cell. Here, as an example, assume that a network node (gNB) with a 3 meter (m) height covers a 120 degree sector. Further assume that the coverage ranges from 4 m to 36 m from the network node (gNB) and that the coverage is using the maximum specified 64 SSBs. An SSB beam has, in this example, a radiation beam width of 5.6 degrees (using 16 elements) in elevation and 22.5 degrees (using 4 elements) in azimuth. Several CSI-RS may have to cover the same angular spread as one SSB beam, and are, therefore, several orders of magnitude narrower than an SSB.

The problem with extending this procedure in the mmWave spectrum is that the extreme narrowness of a CSI-RS causes frequent misalignments, which requires a lengthy and frequent P1-P2-P3 reiteration. Some shortcomings of previous methods addressing this problem include latency and power consumption, since the methods involve exhaustive beam searches at the UE side. At mmWave, this problem may be further exacerbated by the large number of beams that need to be measured. Therefore, a solution having recurrent exhaustive beam measurements may have to be avoided.

Certain previous methods propose localizing the UE by having the UE listen for and report SSB information (e.g., time advance) from neighbor network nodes (gNBs), in an equivalent method to that of traditional triangulation. This information is sent to a location server (LS), which updates the UE position. The LS may then communicate with the serving network node (gNB) and may choose a best beam according to the estimated location.

Such a method uses signaling through a wired interface linking all network nodes (gNBs) to the LS and frequent reports from the UE to the network nodes (gNB). One shortcoming of this method is that the amount of location-related information is bound by the UE measurement and reporting capabilities: since it is up to the UE to measure and report on other network nodes' (gNBs') SSBs, the amount of measurements and reporting may have to be sufficiently small so that the data traffic is not compromised. In a mmWave scenario, the UE may have to smartly select how many neighbor network nodes (gNBs) and how many of their SSBs to measure and report, so that that the power consumption and latency do not severely surge.

Such a selection algorithm would have to use prior information of the cells' configuration and would introduce additional unwanted power consumption. Therefore, even though the network nodes (gNBs) are wired to the LS and could relay a large amount of information, the network nodes (gNBs) cannot exceed the frequency and size of the UE reports, rendering the method inefficient in a mmWave setup. Lastly, another shortcoming of this method is that time advance information alone may prove insufficient for beam selection, since it inherently hides the distribution of obstacles in the network, interferers, etc.

By way of an additional example of the above problems, assume that a moving UE is connected to a serving network node (a serving gNB), through a mmWave narrow-beam connection. Given the UE mobility and the beam narrowness, the UE may not stay more than T seconds in a beam. The maximum period T during which the UE may stay in a beam may be a beam camp time (BCT). BCT may be influenced by the UE velocity and direction, the obstacles distribution in the path of the beam and the geographical coverage of a single network node (gNB) beam. The serving network node (gNB) may estimate BCT for each UE based on, for example, reports and/or estimates of the UE speed.

Therefore, after at most T seconds, the UE may experience a degradation of the link quality (or other selected metric), which may trigger the beam-realignment procedure. Given the narrow coverage of a single network node (gNB) beam, the BCT may be on the order of $10^{-3}$ seconds (s) (assuming that the UE moves at 50 kilometers per hour (kmph) on the arc of a circle with a 100 m radius and spanned by a central angle of 3 degrees, corresponding to a single narrow beam). In this case, the UE may have to measure thousands of beam-pairs between itself and the serving network node, and potentially neighbor network nodes (neighbour gNBs), at a rate higher than the BCT, so that the UE may pre-emptively request a beam switch before it loses connection to the serving network node (gNB). It is apparent that such an approach is infeasible, since the UE will have to spend most of its resources (e.g., time and processing power) in aligning beams.

Some embodiments described herein may provide for GIS-NR beamforming for mmWave. For example, certain embodiments may provide an alternative method of beam re-alignment and better fit for operation beyond certain spectrums, such as 52.6 GHz. Specifically, certain embodiments may provide for beam realignment, through which a serving network node (serving gNB) may be able to re-position its beam towards a UE without the UE explicitly measuring and signalling to the network node (gNB) the need for realignment. Instead of performing the traditional UE-based exhaustive beam search, the serving network node (gNB) may proactively switch the beam in an attempt to track the UE movements. The serving network node (gNB) may do this by corroborating information from two types of sources: 1) from a set of neighbor mobile or fixed network nodes, such as gNBs, IAB nodes, various access points (APs), and/or the like that detect the presence of the UE in their coverage area (these entities may be referred to as mmWave-trackers (mmWTs)) and 2) a geographic information system (GIS) (e.g., utilizing a GIS map, the serving network node (gNB) may be aware of the topography of the cell and may accurately locate the mmWTs, their beam to area coverage, and/or the like).

In this way, certain embodiments may reduce or eliminate a need for exhaustive beam search by the UE to correct for frequent misalignments. In addition, certain embodiments may make use of fixed infrastructure and other idle mobile radios to estimate UE position relative to the topology. Further, certain embodiments may provide for low latency and power consumption operations since the burden of beam sweeping is moved from the UE side to the infrastructure side, thereby conserving time and/or power that would otherwise be consumed through other methods. In addition, certain embodiments may provide for higher accuracy since the serving network node (gNB) may combine data from multiple sources, e.g., a GIS, neighbor network node (gNB) beams, and/or other mobile radios to estimate a relative UE position (relative to the obstacles in the cell, interferers, etc.). As such, certain embodiments described herein may be applicable to a variety of contexts, including bicycle-associated and pedestrian-associated UEs, low speed transporation utilizing mmWave technology, and/or the like.

Figure 1:
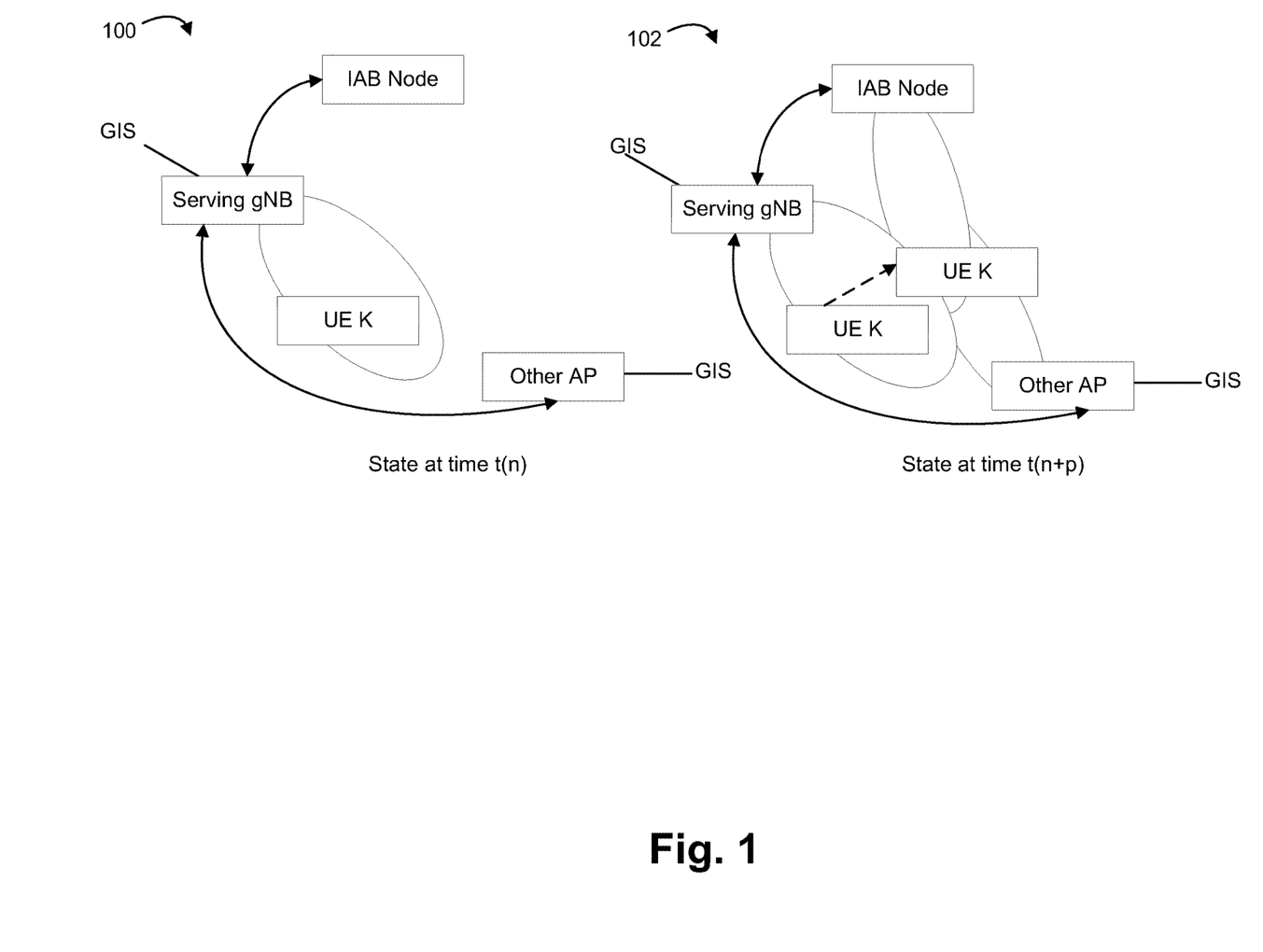
FIG. 1 illustrates an example scenario in which GIS-NR beamforming for mmWave may be implemented, according to some embodiments.

FIG. 1 illustrates an example scenario in which GIS-NR beamforming for mmWave may be implemented, according to some embodiments. For example, FIG. 1 illustrates various network nodes (a serving gNB, an IAB node, and an other access point (AP)), and a UE (UE K) at two different times (t(n) and t(n+p)).

Assume the scenario illustrated in FIG. 1, where the serving gNB is GIS-enabled (e.g., uses a topological map and is aware of the position updates of its neighbors (in this case an IAB node and the other AP), reflectors and obstacles in the network, etc.). The serving gNB may have information identifying the mapping from beam to geography for its neighbors (e.g., that the beam index r of the IAB node covers geographic area r). The other AP, which may be mobile, may also be GIS-enabled. Therefore, the other AP may estimate UE K's position relative to a geographical sector. The IAB node may compute, for UE K, the time of arrival (TA) in a specific beam.

At time n, illustrated at 100, the UE K may be served by the beam index g of the serving gNB. At time (n+p), illustrated at 102, the UE K may have moved (shown by the dotted arrow), and while the UE K is still being served by the same beam, the quality of service (QoS) may severely degrade as a result of poor beam alignment. To avoid this, the serving gNB, the UE K, the IAB node, and/or the other AP may perform one or more operations illustrated in, and described with respect to, FIGS. 2-5 below.

As described above, FIG. 1 is provided as an example. Other examples are possible, according to some embodiments.

Figure 2:
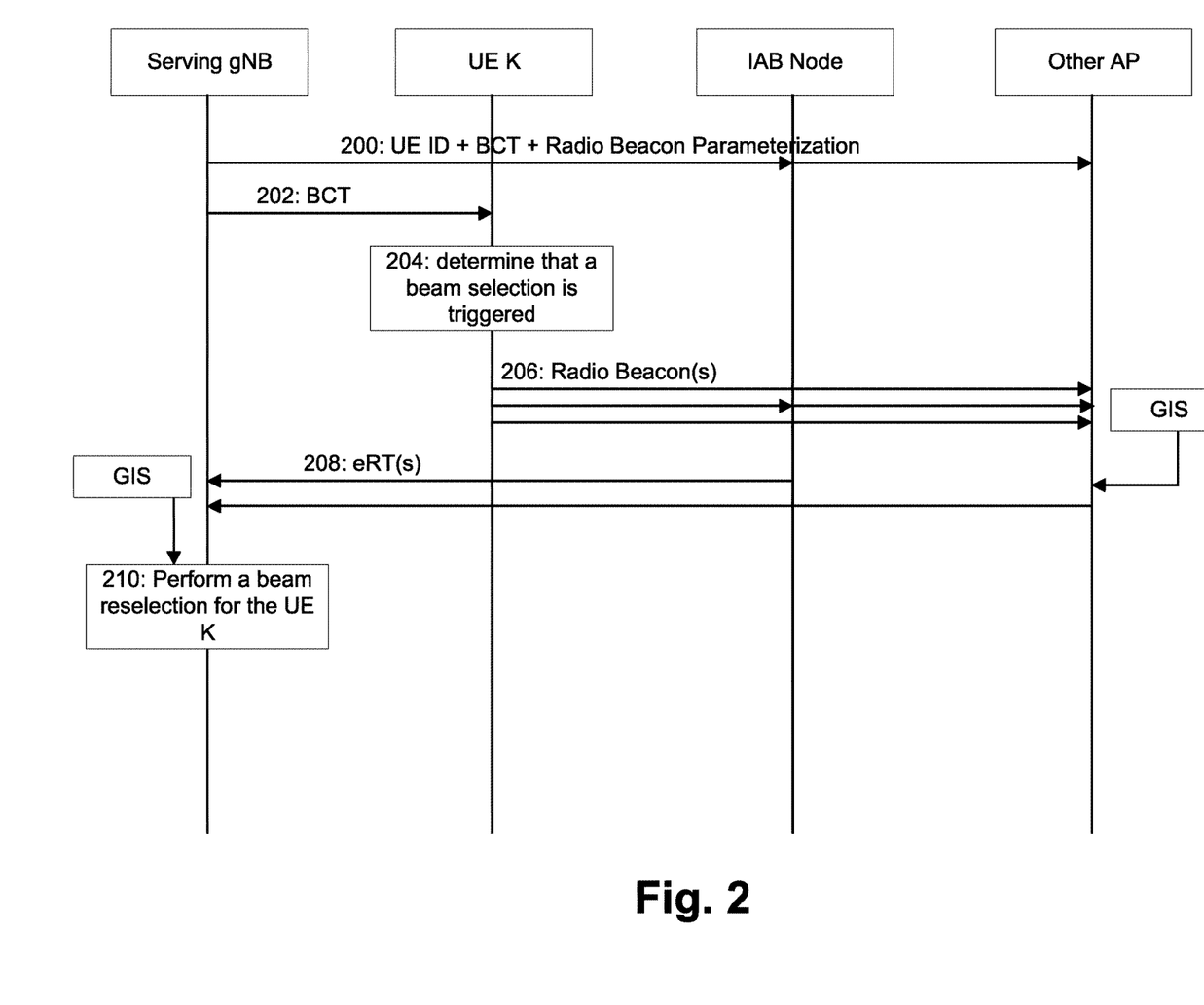
FIG. 2 illustrates an example signal diagram for GIS-NR beamforming for mmWave, according to some embodiments.

FIG. 2 illustrates an example signal diagram for GIS-NR beamforming for mmWave, according to some embodiments. FIG. 2 illustrates the serving gNB, the UE K, the IAB node, and the other AP of FIG. 1.

Prior to the operations illustrated in FIG. 2, the serving gNB may serve the UE K and may compute a metric (e.g., a position estimate or a velocity estimate) for the UE K. For example, the serving gNB may serve the UE K and may compute the UE K's most recent position and velocity estimates. After serving the UE K and/or computing the metric, the serving gNB may compute a BCT of the UE K based on the metric. As illustrated at 200, the serving gNB may transmit an identifier, the BCT, and/or a radio beacon parameterization for the UE K to the IAB node and/or the other AP (e.g., a radio beacon may comprise a Zadoff-Chu sequence or a similar signal, and, in the case of a Zadoff-Chu sequence, the radio beacon parameterization may comprise the root index of the Zadoff-Chu sequence). For example, the serving gNB may send, through backhaul to all neighbor mmWTs, the UE K identifier, the BCT for the UE K, and/or the radio beacon parameterization of the UE K. This may trigger the IAB node and/or the other AP to periodically enter a radio beacon operation mode associated with listening for a radio beacon from the UE K.

As illustrated at 202, the serving gNB may transmit the BCT of the UE K to the UE K. As illustrated at 204, the UE K may determine that a beam selection is triggered. For example, after receiving the BCT, the UE K may start a BCT timer while monitoring the QoS of the current beam from the serving gNB. If either the QoS degrades below (or equal to) a threshold, or the timer expires (e.g., when a period Δm=30 percent of the BCT has expired, the UE K may anticipate that a beam re-alignment will be performed), then, as illustrated at 206, the UE K may enter a passive radio beacon operation mode in which the UE K signals its presence by transmitting radio beacon(s). A radio beacon may be a wideband UE-specific radio beacon, comprising U-shaped consecutive signals (e.g., to enable the mmWTs to act as passive radars of the UE K). This may be done sequentially on each antenna array as the UE K may be unable to transmit simultaneously on multiple panels.

As explained above, available mmWTs may be triggered by the serving gNB to enter a radio beacon operation mode and may listen for the UE K. The IAB node may detect a radio beacon from the UE K and may compute an enhanced relative timing (eRT) for the UE K. For example, the mmWTs may capture the radio beacon in its 1-th beam and may compute the eRT. The eRT may comprise a TA, a TA relative to at least one moving network node, a TA in at least one beam index, and/or a TA in at least one geographical sector index. Similarly, the other-AP may detect the UE K and with the help of GIS can locate the UE K in a specific topographical area.

As illustrated at 206, the mmWTs (e.g., the IAB node and the other AP) may transmit the computed eRTs to the serving gNB. For example, the IAB node may propagate a computed eRT to its neighbors through backhaul. Similarly, the other AP may report its computed eRT to its neighbors, including the serving gNB. This may be done wirelessly, for example, through sidelink communications. Since the other AP may be mobile, the GIS function may enable it to map the UE K to a specific geographic sector, considering the other AP's own movement and beamforming capability.

At this point, serving gNB may have received information about the relative position of the UE K. The serving gNB may build an eRT-based table based on one or more of the eRTs received from the mmWTs. Table 1 below illustrates an example table the serving gNB may build.

TABLE 1 eRT-based table

| eRT | mmWT | mmWT Position |
|---|---|---|
| TA | gNB x | Fixed |
| TA-in-geographical-area-index-k | AP y | Mobile |
| TA-in-beam-index-1 | IAB node A | Fixed |
| TA-to-AP-in-geo-sector-v | Other AP | Mobile |
| T A-to-IAB-in-beam-index-1 | IAB Node A | Fixed |

As illustrated at 210, the serving gNB may perform a beam reselection for the UE K based on the eRTs received from the mmWTs. For example, the serving gNB may use table 1 and a GIS map to update the UE K position and reselect a beam for the UE K. The serving gNB may re-compute the BCT, in some embodiments. The serving gNB may transmit, to the UE K, information that identifies a beam pointing toward the UE K that the serving gNB selected in association with performing the beam reselection. The UE K may reselect a beam pointing toward the serving gNB based on this information.

As indicated above, FIG. 2 is provided as an example. Other examples are possible, according to some embodiments.

Figure 3:
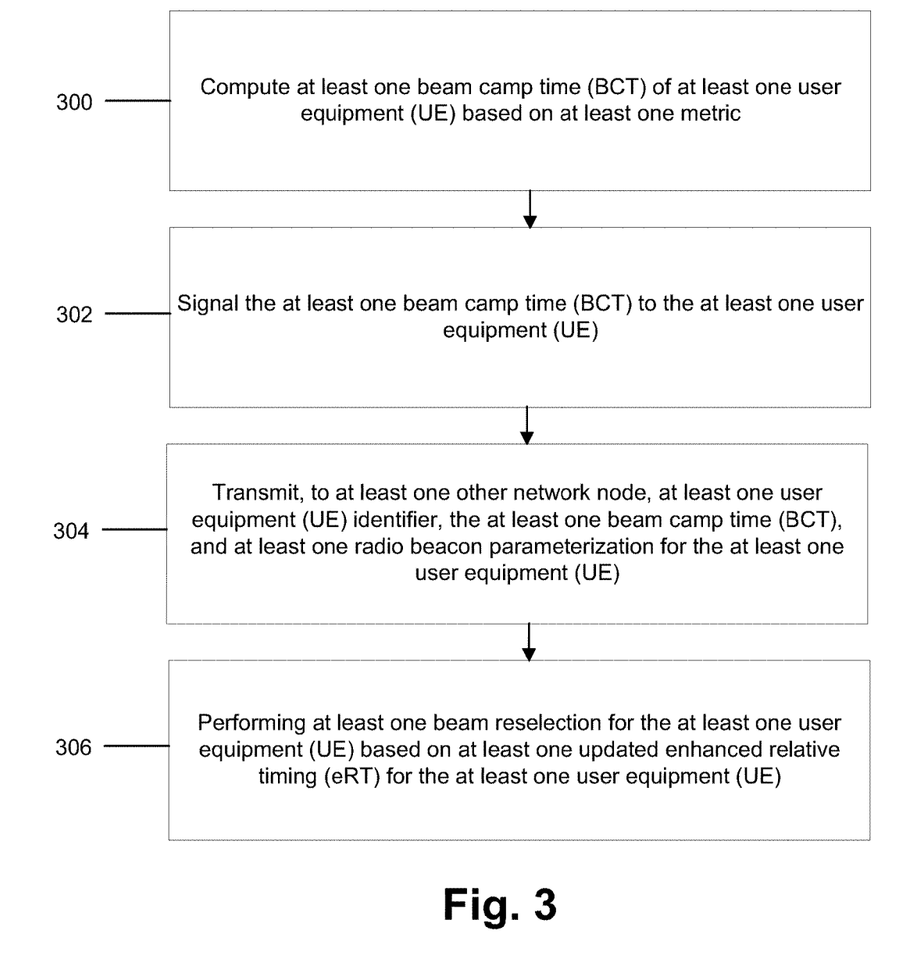
FIG. 3 illustrates an example flow diagram of a method, according to some embodiments.

FIG. 3 illustrates an example flow diagram of a method, according to some embodiments. For example, FIG. 3 shows example operations of a network node (e.g., a serving network node, such as a serving gNB, that may be similar to apparatus 10 described below). Some of the operations illustrated in FIG. 3 may be similar to some operations shown in, and described with respect to, FIGS. 1 and 2.

In an embodiment, the method may include, at 300, computing at least one beam camp time (BCT) of at least one user equipment (UE) based on at least one metric. In an embodiment, the method may include, at 302, signaling the at least one beam camp time (BCT) to the at least one user equipment (UE). In an embodiment, the method may include, at 304, transmitting, to at least one other network node (e.g., a mobile or fixed network node), at least one user equipment (UE) identifier, the at least one beam camp time (BCT), and at least one radio beacon parameterization for the at least one user equipment (UE). In an embodiment, the method may include, at 306, performing at least one beam reselection (e.g., reselect a beam at the network side to point towards the UE) for the at least one user equipment (UE) based on at least one updated enhanced relative timing (eRT) for the at least one user equipment (UE).

In some embodiments, the at least one metric may comprise at least one of: at least one position estimate or at least one velocity estimate. In some embodiments, the method may further comprise serving the at least one user equipment (UE). In some embodiments, the method may further comprise computing the at least one metric for the at least one user equipment (UE) prior to computing the at least one beam camp time (BCT) for the at least one user equipment (UE).

In some embodiments, the at least one other network node may comprise at least one integrated access and backhaul (IAB) node. In some embodiments, the method may further comprise receiving the at least one updated enhanced relative timing (eRT) for the at least one user equipment (UE) after transmitting to the at least one other network node. In some embodiments, the method may further comprise building, prior to performing the at least one beam reselection, at least one enhanced relative timing (eRT)-based table based on the at least one updated enhanced relative timing (eRT). In some embodiments, the at least one enhanced relative timing (eRT)-based table may identify the at least one enhanced relative timing (eRT), at least one network node associated with each of the at least one enhanced relative timing (eRT), and at least one position of the at least one network node.

In some embodiments, the method may further comprise using the at least one enhanced relative timing (eRT)-based table and at least one geographic information system (GIS) map to update at least one position of the at least one user equipment prior to performing the at least one beam reselection. In some embodiments, the method may further comprise re-computing the at least one beam camp time (BCT) for the at least one user equipment (UE) after performing the at least one beam reselection. In some embodiments, the method may further comprise transmitting, to the at least one user equipment (UE), information that identifies at least one beam selected in association with performing the at least one beam reselection. In some embodiments, the at least one enhanced relative timing (eRT) may comprise at least one of: at least one time of arrival (TA), at least one time of arrival relative to at least one moving network node, at least one time of arrival (TA) in at least one beam index, or at least one time of arrival (TA) in at least one geographical sector index.

As described above, FIG. 4 is provided as an example. Other examples are possible according to some embodiments.

Figure 4:
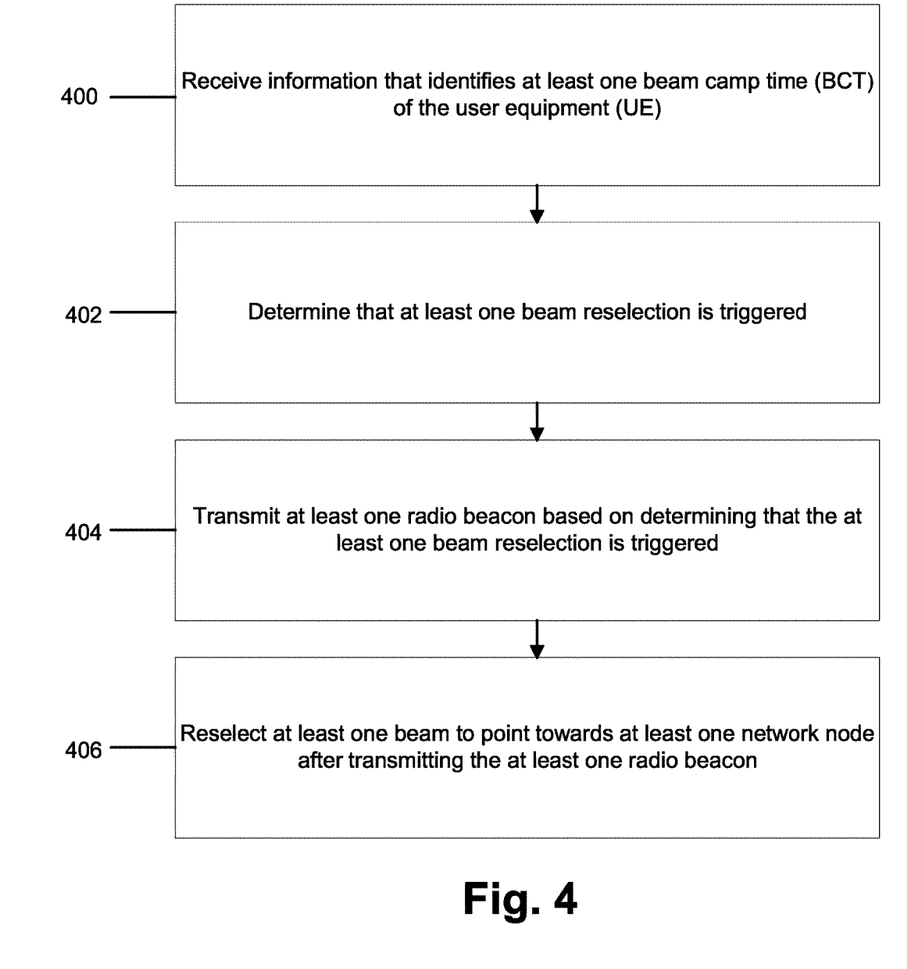
FIG. 4 illustrates an example flow diagram of a method, according to some embodiments.

FIG. 4 illustrates an example flow diagram of a method, according to some embodiments. For example, FIG. 4 shows example operations of a UE (e.g., UE K, which may be similar to apparatus 20 described elsewhere herein). Some of the operations illustrated in FIG. 4 may be similar to some operations shown in, and described with respect to, FIGS. 1 and 2.

In an embodiment, the method may include, at 400, receiving information that identifies at least one beam camp time (BCT) of the user equipment (UE). In an embodiment, the method may include, at 402, determining that at least one beam reselection is triggered. In an embodiment, the method may include, at 404, transmitting at least one radio beacon based on determining that the at least one beam reselection is triggered. In an embodiment, the method may include, at 406, reselecting at least one beam to point towards at least one network node after transmitting the at least one radio beacon.

In some embodiments, determining that the at least one beam reselection is triggered may further comprise determining that the at least one beam reselection is triggered based on at least one of: at least one decrease in at least one quality of service (QoS) for the user equipment (UE) satisfying at least one threshold, or expiration of at least one timer associated with the at least one beam camp time (BCT). In some embodiments, the at least one radio beacon may comprise at least one wideband user equipment (UE)-specific radio beacon. In some embodiments, the at least one wideband user equipment (UE)-specific radio beacon may be shaped as at least one block of U signals.

In some embodiments, transmitting the at least one radio beacon may further comprise: transmitting the at least one radio beacon sequentially on each antenna array of multiple antenna arrays of the user equipment (UE). In some embodiments, the method may further comprise receiving information that identifies at least one selected beam pointing toward the user equipment (UE), and reselecting the at least one beam pointing toward the at least one network node may further comprise: reselecting the at least one beam pointing toward the at least one network node based on the at least one selected beam pointing toward the user equipment (UE).

As described above, FIG. 4 is provided as an example. Other examples are possible according to some embodiments.

Figure 5:
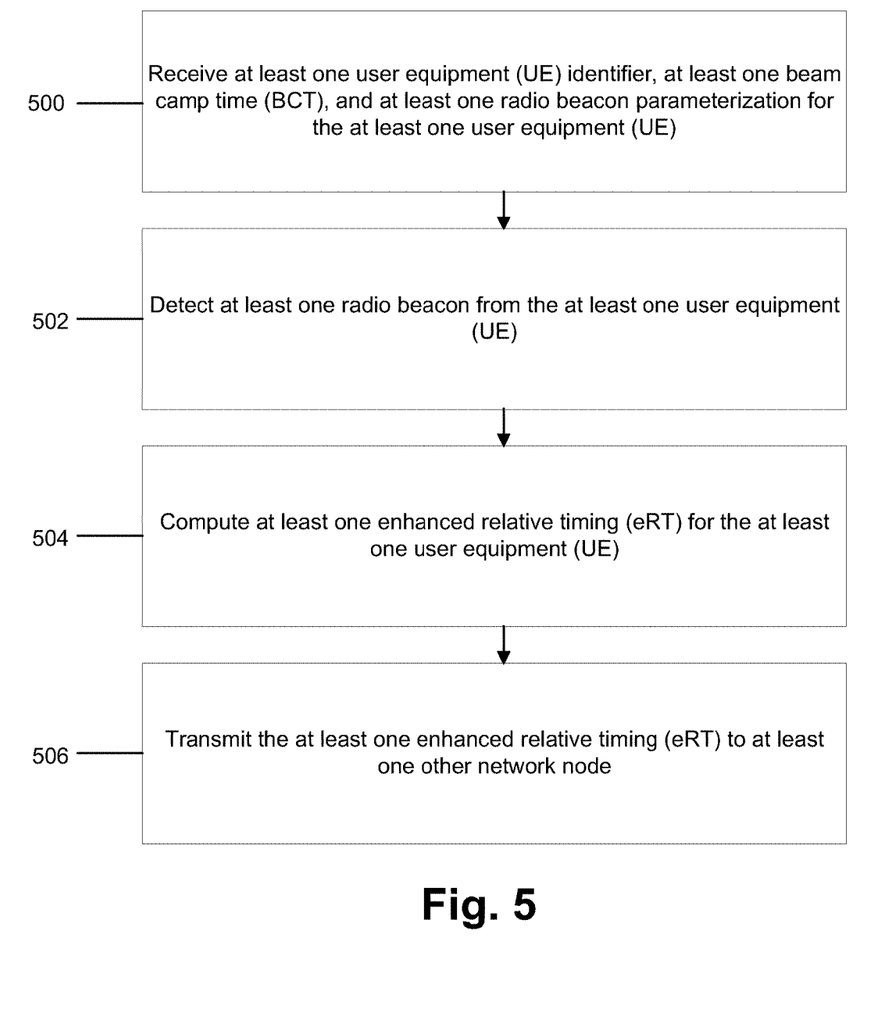
FIG. 5 illustrates an example flow diagram of a method, according to some embodiments.

FIG. 5 illustrates an example flow diagram of a method, according to some embodiments. For example, FIG. 5 shows example operations of a network node (e.g., an IAB node, an other AP, and/or the like, similar to apparatus 10 described elsewhere herein). Some of the operations illustrated in FIG. 5 may be similar to some operations shown in, and described with respect to, FIGS. 1 and 2.

In an embodiment, the method may include, at 500, receiving at least one user equipment (UE) identifier, at least one beam camp time (BCT), and at least one radio beacon parameterization for the at least one user equipment (UE). In an embodiment, the method may include, at 502, detecting at least one radio beacon from the at least one user equipment (UE). In an embodiment, the method may include, at 504, computing at least one enhanced relative timing (eRT) for the at least one user equipment (UE). In an embodiment, the method may include, at 506, transmitting the at least one enhanced relative timing (eRT) to at least one other network node.

In some embodiments, the at least one radio beacon may comprise at least one wideband user equipment (UE)-specific radio beacon. In some embodiments, the at least one wideband user equipment (UE)-specific radio beacon may be shaped as at least one block of U signals. In some embodiments, the method may further comprise entering at least one radio beacon operation mode prior to detecting the at least one radio beacon. In some embodiments, the at least one enhanced relative timing (eRT) may comprise at least one of: at least one time of arrival (TA), at least one time of arrival (TA) relative to at least one moving network node, at least one time of arrival (TA) in at least one beam index, or at least one time of arrival (TA) in at least one geographical sector index. In some embodiments, the network node may comprise an integrated and backhaul node and wherein the at least one other network node may comprise at least one other integrated and backhaul node or at least one base station (BS).

As described above, FIG. 5 is provided as an example. Other examples are possible according to some embodiments.

Figure 6A:
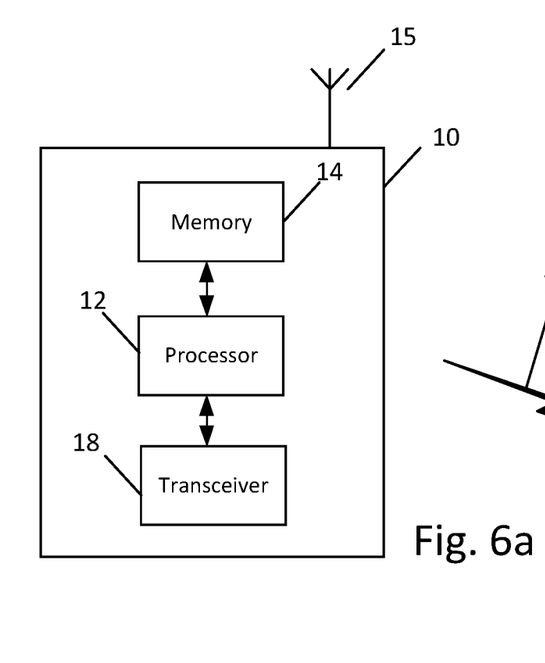
FIG. 6a illustrates an example block diagram of an apparatus, according to an embodiment.

FIG. 6a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), an IAB node, and/or a WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6a.

As illustrated in the example of FIG. 6a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of flow or signaling diagrams illustrated in FIGS. 1-5.

For instance, in one embodiment, apparatus 10 may be controlled by memory 14 and processor 12 to compute at least one beam camp time (BCT) of at least one user equipment (UE) based on at least one metric. In one embodiment, apparatus 10 may be controlled by memory 14 and processor 12 to signal the at least one beam camp time (BCT) to the at least one user equipment (UE). In one embodiment, apparatus 10 may be controlled by memory 14 and processor 12 to transmit, to at least one other network node, at least one user equipment (UE) identifier, the at least one beam camp time (BCT), and at least one radio beacon parameterization for the at least one user equipment (UE). In one embodiment, apparatus 10 may be controlled by memory 14 and processor 12 to perform at least one beam reselection for the at least one user equipment (UE) based on at least one updated enhanced relative timing (eRT) for the at least one user equipment (UE)

In one embodiment, apparatus 10 may be controlled by memory 14 and processor 12 to receive at least one user equipment (UE) identifier, at least one beam camp time (BCT), and at least one radio beacon parameterization for the at least one user equipment (UE). In one embodiment, apparatus 10 may be controlled by memory 14 and processor 12 to detect at least one radio beacon from the at least one user equipment (UE). In one embodiment, apparatus 10 may be controlled by memory 14 and processor 12 to compute at least one enhanced relative timing (eRT) for the at least one user equipment (UE). In one embodiment, apparatus 10 may be controlled by memory 14 and processor 12 to transmit the at least one enhanced relative timing (eRT) to at least one other network node.

Figure 6B:
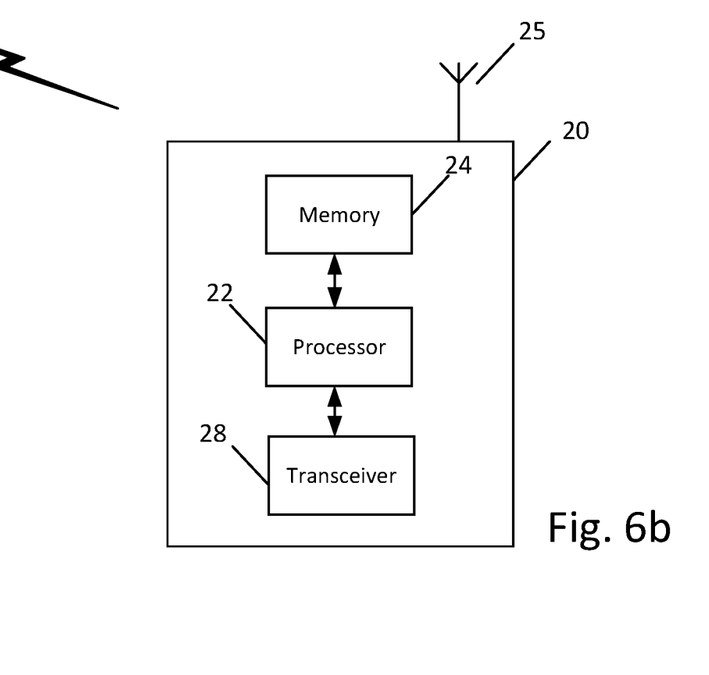
FIG. 6b illustrates an example block diagram of an apparatus, according to another embodiment.

FIG. 6b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6b.

As illustrated in the example of FIG. 6b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-5.

For instance, in one embodiment, apparatus 20 may be controlled by memory 24 and processor 22 to receive information that identifies at least one beam camp time (BCT) of the user equipment (UE). In one embodiment, apparatus 20 may be controlled by memory 24 and processor 22 to determine that at least one beam reselection is triggered. In one embodiment, apparatus 20 may be controlled by memory 24 and processor 22 to transmit at least one radio beacon based on determining that the at least one beam reselection is triggered. In one embodiment, apparatus 20 may be controlled by memory 24 and processor 22 to reselect at least one beam to point towards at least one network node after transmitting the at least one radio beacon.

Therefore, certain example embodiments provide several technological improvements, enhancements, and/or advantages over existing technological processes. For example, one benefit of some example embodiments is a reduction or elimination of exhaustive beam search by the UE to correct for frequent misalignments. Accordingly, the use of some example embodiments results in improved functioning of communications networks and their nodes and, therefore constitute an improvement at least to the technological field of beam selection.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

According to a first embodiment, a method may include computing at least one beam camp time (BCT) of at least one user equipment (UE) based on at least one metric. The method may include signaling the at least one beam camp time (BCT) to the at least one user equipment (UE). The method may include transmitting, to at least one other network node, at least one user equipment (UE) identifier, the at least one beam camp time (BCT), and at least one radio beacon parameterization for the at least one user equipment (UE). The method may include performing at least one beam reselection for the at least one user equipment (UE) based on at least one updated enhanced relative timing (eRT) for the at least one user equipment (UE).

In a variant, the at least one metric may comprise at least one of: at least one position estimate or at least one velocity estimate. In a variant, the method may further comprise serving the at least one user equipment (UE). In a variant, the method may further comprise computing the at least one metric for the at least one user equipment (UE) prior to computing the at least one beam camp time (BCT) for the at least one user equipment (UE).

In a variant, the at least one other network node may comprise at least one integrated access and backhaul (IAB) node. In a variant, the method may further comprise receiving the at least one updated enhanced relative timing (eRT) for the at least one user equipment (UE) after transmitting to the at least one other network node. In a variant, the method may further comprise building, prior to performing the at least one beam reselection, at least one enhanced relative timing (eRT)-based table based on the at least one updated enhanced relative timing (eRT). In a variant, the at least one enhanced relative timing (eRT)-based table may identify the at least one enhanced relative timing (eRT), at least one network node associated with each of the at least one enhanced relative timing (eRT), and at least one position of the at least one network node.

In a variant, the method may further comprise using the at least one enhanced relative timing (eRT)-based table and at least one geographic information system (GIS) map to update at least one position of the at least one user equipment prior to performing the at least one beam reselection. In a variant, the method may further comprise re-computing the at least one beam camp time (BCT) for the at least one user equipment (UE) after performing the at least one beam reselection. In a variant, the method may further comprise transmitting, to the at least one user equipment (UE), information that identifies at least one beam selected in association with performing the at least one beam reselection. In a variant, the at least one enhanced relative timing (eRT) may comprise at least one of: at least one time of arrival (TA), at least one time of arrival relative to at least one moving network node, at least one time of arrival (TA) in at least one beam index, or at least one time of arrival (TA) in at least one geographical sector index.

According to a first embodiment, a method may include receiving, by a user equipment (UE), information that identifies at least one beam camp time (BCT) of the user equipment (UE). The method may include determining that at least one beam reselection is triggered. The method may include transmitting at least one radio beacon based on determining that the at least one beam reselection is triggered. The method may include reselecting at least one beam to point towards at least one network node after transmitting the at least one radio beacon.

In a variant, determining that the at least one beam reselection is triggered may further comprise determining that the at least one beam reselection is triggered based on at least one of: at least one decrease in at least one quality of service (QoS) for the user equipment (UE) satisfying at least one threshold, or expiration of at least one timer associated with the at least one beam camp time (BCT). In a variant, the at least one radio beacon may comprise at least one wideband user equipment (UE)-specific radio beacon. In a variant, the at least one wideband user equipment (UE)-specific radio beacon may be shaped as at least one block of U signals.

In a variant, transmitting the at least one radio beacon may further comprise: transmitting the at least one radio beacon sequentially on each antenna array of multiple antenna arrays of the user equipment (UE). In a variant, the method may further comprise receiving information that identifies at least one selected beam pointing toward the user equipment (UE), and reselecting the at least one beam pointing toward the at least one network node may further comprise: reselecting the at least one beam pointing toward the at least one network node based on the at least one selected beam pointing toward the user equipment (UE).

According to a third embodiment, a method may include receiving, by a network node, at least one user equipment (UE) identifier, at least one beam camp time (BCT), and at least one radio beacon parameterization for the at least one user equipment (UE). The method may include detecting at least one radio beacon from the at least one user equipment (UE). The method may include computing at least one enhanced relative timing (eRT) for the at least one user equipment (UE). The method may include transmitting the at least one enhanced relative timing (eRT) to at least one other network node.

In a variant, the at least one radio beacon comprises at least one wideband user equipment (UE)-specific radio beacon. In a variant, the at least one wideband user equipment (UE)-specific radio beacon is shaped as at least one block of U signals. In a variant, the method may further comprise entering at least one radio beacon operation mode prior to detecting the at least one radio beacon. In a variant, the at least one enhanced relative timing (eRT) comprises at least one of: at least one time of arrival (TA), at least one time of arrival (TA) relative to at least one moving network node, at least one time of arrival (TA) in at least one beam index, or at least one time of arrival (TA) in at least one geographical sector index. In a variant, the network node comprises an integrated and backhaul node and wherein the at least one other network node comprises at least one other integrated and backhaul node or at least one base station (BS).

A fourth embodiment may be directed to an apparatus including at least one processor and at least one memory comprising computer program code. The at least one memory and computer program code may be configured, with the at least one processor, to cause the apparatus at least to perform the method according to the first embodiment, the second embodiment, or the third embodiment, or any of the variants discussed above.

A fifth embodiment may be directed to an apparatus that may include circuitry configured to perform the method according to the first embodiment, the second embodiment, or the third embodiment, or any of the variants discussed above.

A sixth embodiment may be directed to an apparatus that may include means for performing the method according to the first embodiment, the second embodiment, or the third embodiment, or any of the variants discussed above.

A seventh embodiment may be directed to a computer readable medium comprising program instructions stored thereon for performing at least the method according to the first embodiment, the second embodiment, or the third embodiment, or any of the variants discussed above.

An eighth embodiment may be directed to a computer program product encoding instructions for performing at least the method according to the first embodiment, the second embodiment, or the third embodiment, or any of the variants discussed above.

What is claimed is:

1. An apparatus, comprising:
    at least one processor; and
    at least one memory including computer program code, wherein the at least one memory and the computer program code are configured to, with the at least one processor, cause the apparatus at least to:
        compute at least one beam camp time of at least one user equipment based on at least one metric;
        signal the at least one beam camp time to the at least one user equipment;
        transmit, to at least one network node comprising an integrated access and backhaul node, at least one user equipment identifier, the at least one beam camp time, and at least one radio beacon parameterization for the at least one user equipment; and
        perform at least one beam reselection for a radio channel between the apparatus and the at least one user equipment based on at least one updated relative timing for the at least one user equipment received from the at least one network node.

2. The apparatus according to claim 1, wherein the at least one metric comprises at least one of: at least one position estimate and at least one velocity estimate.

3. The apparatus according to claim 1, wherein the at least one memory and the computer program code are configured to, with the at least one processor, cause the apparatus at least to:
    serve the at least one user equipment; and
    compute the at least one metric for the at least one user equipment prior to computing the at least one beam camp time for the at least one user equipment.

4. The apparatus according to claim 1, wherein the at least one memory and the computer program code are configured to, with the at least one processor, cause the apparatus at least to:
    receive the at least one updated relative timing for the at least one user equipment after transmitting to the at least one network node; and
    build, prior to performing the at least one beam reselection, at least one relative timing-based table based on the at least one updated relative timing.

5. The apparatus according to claim 4, wherein the at least one relative timing-based table identifies the at least one relative timing, one or more network nodes associated with each of the at least one relative timing, and at least one position of the one or more network nodes.

6. The apparatus according to claim 4, wherein the at least one memory and the computer program code are configured to, with the at least one processor, cause the apparatus at least to:
    use the at least one relative timing-based table and at least one geographic information system map to update at least one position of the at least one user equipment prior to performing the at least one beam reselection.

7. The apparatus according to claim 1, wherein the at least one memory and the computer program code are configured to, with the at least one processor, cause the apparatus at least to:
    re-compute the at least one beam camp time for the at least one user equipment after performing the at least one beam reselection.

8. The apparatus according to claim 1, wherein the at least one memory and the computer program code are configured to, with the at least one processor, cause the apparatus at least to:
    transmit, to the at least one user equipment, information that identifies at least one beam selected in association with performing the at least one beam reselection.

9. The apparatus according to claim 1, wherein the at least one relative timing comprises at least one of:
    at least one time of arrival,
    at least one time of arrival relative to at least one moving network node,
    at least one time of arrival in at least one beam index, and
    at least one time of arrival in at least one geographical sector index.

10. An apparatus, comprising:
    at least one processor; and
    at least one memory including computer program code, wherein the at least one memory and the computer program code are configured to, with the at least one processor, cause the apparatus at least to:
        receive information that identifies at least one beam camp time of the apparatus;
        determine that at least one beam reselection is triggered by at least one network node;
        transmit at least one radio beacon to at least one access node comprising an integrated access and backhaul node based on determining that the at least one beam reselection is triggered; and
        reselect at least one beam to point towards the at least one network node after transmitting the at least one radio beacon.

11. The apparatus according to claim 10, wherein the at least one memory and the computer program code are configured to, with the at least one processor, cause the apparatus, when determining that the at least one beam reselection is triggered, at least to:
    determine that the at least one beam reselection is triggered based on at least one of:
    at least one decrease in at least one quality of service for the apparatus satisfying at least one threshold, and
    expiration of at least one timer associated with the at least one beam camp time.

12. The apparatus according to claim 10, wherein the at least one radio beacon comprises at least one wideband user equipment-specific radio beacon.

13. The apparatus according to claim 10, wherein the at least one memory and the computer program code are configured to, with the at least one processor, cause the apparatus, when transmitting the at least one radio beacon, at least to:
    transmit the at least one radio beacon sequentially on each antenna array of multiple antenna arrays of the apparatus.

14. The apparatus according to claim 10, wherein the at least one memory and the computer program code are configured to, with the at least one processor, cause the apparatus at least to:

receive information that identifies at least one selected beam pointing toward the apparatus and wherein reselecting the at least one beam pointing toward the at least one network node further comprises:
reselect the at least one beam pointing toward the at least one network node based on the at least one selected beam pointing toward the apparatus.

15. An apparatus, comprising:
at least one processor; and
at least one memory including computer program code, wherein the at least one memory and the computer program code are configured to, with the at least one processor, cause the apparatus at least to:
receive, from at least one network node serving at least one user equipment, at least one user equipment identifier, at least one beam camp time, and at least one radio beacon parameterization for the at least one user equipment;
detect at least one radio beacon from the at least one user equipment;
compute at least one relative timing for the at least one user equipment; and
transmit the at least one relative timing to the at least one network node for performing at least one beam reselection for a radio channel between the at least one network node and the at least one user equipment.

16. The apparatus according to claim 15, wherein the at least one radio beacon comprises at least one wideband user equipment-specific radio beacon.

17. The apparatus according to claim 15, wherein the at least one memory and the computer program code are configured to, with the at least one processor, cause the apparatus at least to:
enter at least one radio beacon operation mode prior to detecting the at least one radio beacon.

18. The apparatus according to claim 15, wherein the at least one relative timing comprises at least one of:
at least one time of arrival,
at least one time of arrival relative to at least one moving network node,
at least one time of arrival in at least one beam index, and
at least one time of arrival in at least one geographical sector index.

* * * * *